(12) United States Patent
Imanishi et al.

(10) Patent No.: US 10,756,612 B2
(45) Date of Patent: Aug. 25, 2020

(54) EDDY CURRENT DECELERATION DEVICE

(71) Applicant: NIPPON STEEL & SUMITOMO METAL CORPORATION, Tokyo (JP)

(72) Inventors: Kenji Imanishi, Toyonaka (JP); Hiroshi Nogami, Takatsuki (JP); Yasutaka Noguchi, Takarazuka (JP); Hiroyuki Yamaguchi, Nishinomiya (JP); Takuya Fujita, Yao (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 342 days.

(21) Appl. No.: 15/564,019

(22) PCT Filed: Jun. 9, 2016

(86) PCT No.: PCT/JP2016/067170
§ 371 (c)(1),
(2) Date: Oct. 3, 2017

(87) PCT Pub. No.: WO2016/199836
PCT Pub. Date: Dec. 15, 2016

(65) Prior Publication Data
US 2018/0138795 A1      May 17, 2018

(30) Foreign Application Priority Data

Jun. 12, 2015   (JP) .................................. 2015-119016

(51) Int. Cl.
*H02K 49/04*      (2006.01)
(52) U.S. Cl.
CPC ......... *H02K 49/043* (2013.01); *H02K 49/046* (2013.01); *H02K 2213/09* (2013.01)
(58) Field of Classification Search
CPC ........................... H02K 49/043; H02K 49/046
(Continued)

(56) References Cited

U.S. PATENT DOCUMENTS

| 6,523,650 B1 | 2/2003 | Pribonic et al. |
| 2002/0020592 A1* | 2/2002 | Tani ................. H02K 49/043 188/164 |

(Continued)

FOREIGN PATENT DOCUMENTS

| JP | 7-9085 | 2/1995 |
| JP | 0992498 A | 4/1997 |

(Continued)

OTHER PUBLICATIONS

ISR issued in Int'l. App. No. PCT/JP2016/067170, dated Aug. 9, 2016.

*Primary Examiner* — Gary A Nash
(74) *Attorney, Agent, or Firm* — Greer Burns & Crain Ltd.

(57) ABSTRACT

The disclosed is a deceleration device including a cylindrical brake member fixed to a rotary shaft, a plurality of permanent magnets arrayed in a circumferential direction of a circle around the rotary shaft, a cylindrical magnet holder holding the permanent magnets, and a switching mechanism that switches between a braking state and a non-braking state. The plurality of permanent magnets include primary magnets and secondary magnets that are arrayed alternatively in the circumferential direction. When viewed on a surface facing the brake member, north poles of the primary magnets are circumferentially adjacent to and in contact with north poles of the secondary magnets, and south poles of the primary magnets are circumferentially adjacent to and in contact with south poles of the secondary magnets. The magnetic holder is ferromagnetic.

16 Claims, 16 Drawing Sheets

(58) Field of Classification Search
USPC .......................................................... 310/93
See application file for complete search history.

(56) References Cited

U.S. PATENT DOCUMENTS

| | | | |
|---|---|---|---|
| 2003/0221920 A1* | 12/2003 | Kuwahara | H02K 49/043 |
| | | | 188/158 |
| 2005/0146213 A1* | 7/2005 | Imanishi | H02K 49/046 |
| | | | 303/152 |
| 2014/0084731 A1 | 3/2014 | Iwami et al. | |

FOREIGN PATENT DOCUMENTS

| | | |
|---|---|---|
| JP | 2000-312466 A | 11/2000 |
| JP | 2000-333389 A | 11/2000 |
| JP | 2002-359941 A | 12/2002 |
| JP | 2004-48963 A | 2/2004 |
| JP | 2004-350427 A | 12/2004 |
| JP | 2005-174801 A | 6/2005 |
| JP | 2007-014110 A | 1/2007 |
| JP | 200719127 A | 1/2007 |
| JP | 2012217278 A | 11/2012 |

* cited by examiner

EDDY CURRENT DECELERATION DEVICE

This is a National Phase Application filed under 35 U.S.C. § 371, of International Application No. PCT/JP2016/067170, filed Jun. 9, 2016, the contents of which are incorporated by reference.

TECHNICAL FIELD

The present invention relates to a deceleration device to be employed in a vehicle, such as a truck, a bus or the like, as an auxiliary brake, and more particularly to an eddy current deceleration device employing permanent magnets for generation of braking force.

BACKGROUND ART

An eddy current deceleration device (which will hereinafter be referred to simply as a "deceleration device") employing permanent magnets (which will hereinafter be referred to simply as "magnets") includes a brake member fixed to a rotary shaft of a vehicle. In the eddy current deceleration device, in a braking state, eddy currents are generated in the surface of the brake member facing the magnets by the effect of magnetic fields of the magnets. Thereby, on the brake member that is rotating together with the rotary shaft, braking torque in a direction opposite to the rotational direction acts, and the rotational speed of the rotary shaft gradually decreases. Deceleration devices are classified into a drum type and a disk type according to the configuration of the brake member where eddy currents are generated, and the magnet holder which holds the magnets and is paired with the brake member. Generally, deceleration devices of the drum type are often used. For example, Japanese Patent Application Publication 2004-48963 (Patent Literature 1) discloses a drum-type deceleration device.

FIG. 1 is a longitudinal sectional view of a common drum type deceleration device. FIG. 2 is a perspective view showing the arrangement of permanent magnets in a conventional drum type deceleration device. FIGS. 3 and 4 cross-sectional views showing the generation status of magnetic circuits in the conventional deceleration device. FIG. 3 shows a braking state, and FIG. 4 shows a non-braking state. A longitudinal section means a section along the rotary shaft. A cross section means a section perpendicular to the rotary shaft.

As shown in FIG. 1, the deceleration device includes a cylindrical brake drum 1, and a cylindrical magnet holding ring 2 disposed inside the brake drum 1. The brake drum 1 is equivalent to the brake member to be provided with braking torque, and is fixed to a rotary shaft 10 (for example, a propeller shaft, a drive shaft or the like) of a vehicle via a rotor support 6. Accordingly, the brake drum 1 rotates together with the rotary shaft 10. The arrow in FIG. 1 shows an example of the rotational direction of the brake drum 1. The brake drum 1 has a radiator fin 1a on the outer periphery. The radiator fin 1a functions to cool the brake drum 1 itself. In the drawings other than FIG. 1, the radiator fin 1a is omitted.

The magnet holding ring 2 is equivalent to the magnet holder which is paired with the brake drum 1 (brake member), and is rotatably supported by the rotary shaft 10 via a stator support 7. The stator support 7 is fixed to a non-rotative member (for example, a transmission cover) of the vehicle.

As shown in FIGS. 1 and 2, a plurality of permanent magnets 3 are fixed on the outer peripheral surface of the magnet holding ring 2. The magnets 3 face the inner peripheral surface of the brake drum 1 with a gap, and the magnets 3 are arrayed in a circumferential direction throughout the whole circumference of a circle around the rotary shaft 10. The magnets 3 are laid such that the magnetic poles (the north pole and the south pole) of each of the magnets 3 are arranged in a radial direction from the axis of the rotary shaft 10 and such that the magnetic pole arrangements of circumferentially adjacent ones of the magnets 3 are opposite to each other. The magnet holding ring 2 is made of a ferromagnetic material.

As shown in FIGS. 1, 3 and 4, a plurality of ferromagnetic plate-like switches 4 are disposed in the gap between the brake drum 1 and the magnets 3. The plate-like switches 4 are arrayed in the circumferential direction throughout the whole circumference around the rotary shaft 10. The placement angles of the switches 4 are the same as the placement angles of the magnets 3. Both sides of the respective switches 4 are held by a switch holding ring 5. The switch holding ring 5 is fixed to the stator support 7.

To the switch holding ring 5, a drive unit (not shown) such as an air cylinder, an electric actuator or the like, is connected. For switching to a braking state or a non-braking state, the magnet holding ring 2 and the magnets 3 are rotated together by operation of the drive unit. In this way, the deceleration device can be switched between a braking state where each of the switches 4 entirely overlaps the magnet 3 immediately below (see FIG. 3) and a non-braking state where each of the switches 4 lies across two adjacent magnets 3 (see FIG. 4). Thus, the conventional deceleration device shown in FIGS. 2 to 4 employs, as a switching mechanism for switching between a braking state and a non-braking state, a structure in which the magnet holding ring 2 is rotatable around the rotary shaft 10. A switching mechanism having such a structure will hereinafter be referred to as a "single-row rotation switching mechanism".

In the non-braking state, the single-row rotation switching mechanism operates to keep each of the switches 4 across two adjacent magnets 3 as shown in FIG. 4. In this state, the magnetic fluxes from the magnets 3 (magnetic fields of the magnets 3) are as follows. With regard to a first magnet 3 and a second magnet 3 that are adjacent to each other, the magnetic flux outgoing from the north pole of the first magnet 3 reaches the south pole of the second magnet 3 through the switch 4 therebetween. The magnetic flux outgoing from the north pole of the second magnet 3 reaches the south pole of the first magnet 3 via the magnet holding ring 2. Thus, no magnetic circuits are generated between the magnets 3 and the brake drum 1. In this state, no braking torque acts on the brake drum 1.

For switching to the braking state, the single-row rotation switching mechanism operates to rotate the magnet holding ring 2 by an angle that is about a half of the placement angle between two adjacent magnets 3. Thereby, each of the switches 4 is positioned to entirely overlap the magnet 3 immediately below as shown in FIG. 3. In this state, the magnetic fluxes from the magnets 3 (magnetic fields of the magnets 3) are as follows.

With regard to a first magnet 3 and a second magnet 3 that are adjacent to each other, the magnetic flux outgoing from the north pole of the first magnet 3 passes through the switch 4 located over the first magnet 3 and reaches the brake drum 1. The magnetic flux that has reached the brake drum 1 reaches the south pole of the second magnet 3 through the switch 4 located over the second magnet 3. The magnetic flux outgoing from the north pole of the second magnet 3 reaches the south pole of the first magnet 3 via the magnet holding ring 2. Thus, the circumferentially adjacent magnets 3 form a magnetic circuit across the adjacent magnets 3, the magnet holding ring 2, the switches 4 and the brake drum 1. Such magnetic circuits are formed throughout the whole circumference such that the directions of adjacent magnetic fluxes are opposite to each other. Then, on the brake drum 1 that is rotating together with the rotary shaft 10, braking torque in a direction opposite to the rotational direction acts.

CITATION LIST

Patent Literature

Patent Literature 1: Japanese Patent Application Publication No. 2004-48963

SUMMARY OF INVENTION

Technical Problems

The above-described conventional deceleration device can provide a fair amount of braking torque. In recent years, however, vehicles are improving in performance. Along with the improvement, deceleration devices that can generate higher braking torque are strongly demanded.

An object of the present invention is to provide an eddy current deceleration device that is capable of generating high braking torque.

Solution to Problems

An eddy current deceleration device according to an embodiment of the present invention includes: a cylindrical brake member fixed to a rotary shaft; a plurality of permanent magnets arrayed in a circumferential direction of a circle around the rotary shaft to face an outer peripheral surface or an inner peripheral surface of the brake member with a gap; a cylindrical magnet holder holding the permanent magnets; and a switching mechanism that switches between a braking state and a non-braking state. The plurality of permanent magnets are located between the brake member and the magnet holder. The plurality of permanent magnets include primary magnets and secondary magnets that are arrayed alternatively in the circumferential direction. The primary magnets are laid such that magnetic poles of each of the primary magnets are arranged in a radial direction from an axis of the rotary shaft and such that two circumferentially adjacent ones of the primary magnets have opposite magnetic pole arrangements. The secondary magnets are laid such that magnetic poles of each of the secondary magnets are arranged in the circumferential direction. When viewed on a surface facing the brake member, north poles of the primary magnets are circumferentially adjacent to north poles of the secondary magnets, and south poles of the primary magnets are circumferentially adjacent to south poles of the secondary magnets. The magnetic holder is ferromagnetic.

Advantage Effects of Invention

The eddy current deceleration device according to the present invention is capable of generating high braking torque.

EMBODIMENTS OF INVENTION

Figure 1:
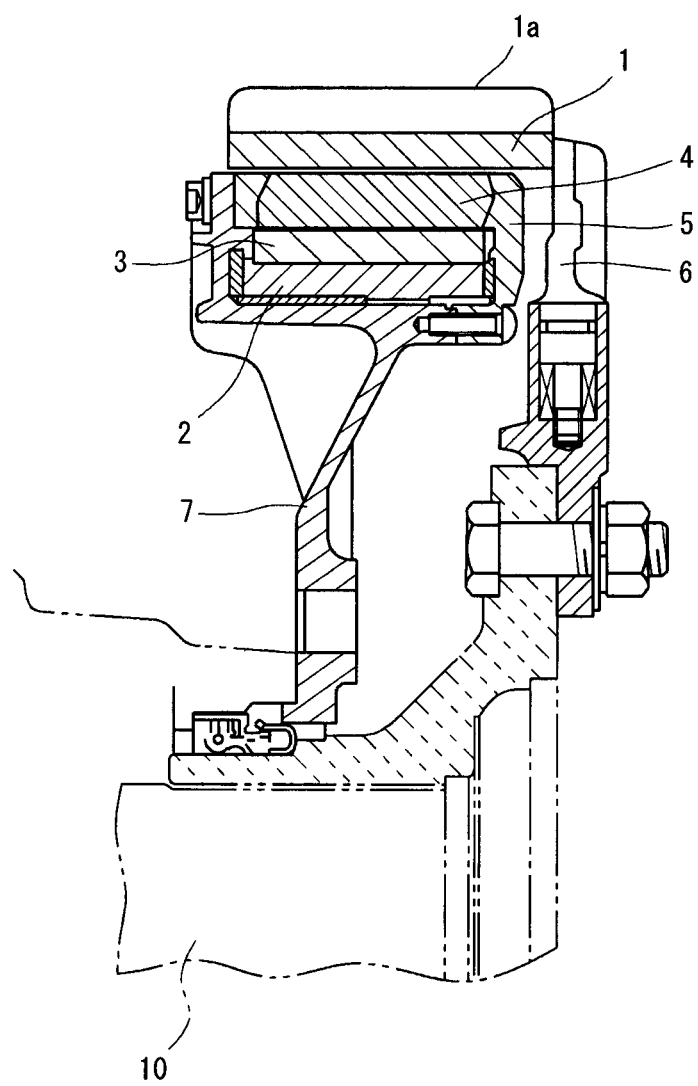
FIG. 1 is a longitudinal sectional view of a common drum-type deceleration device.
Figure 2:
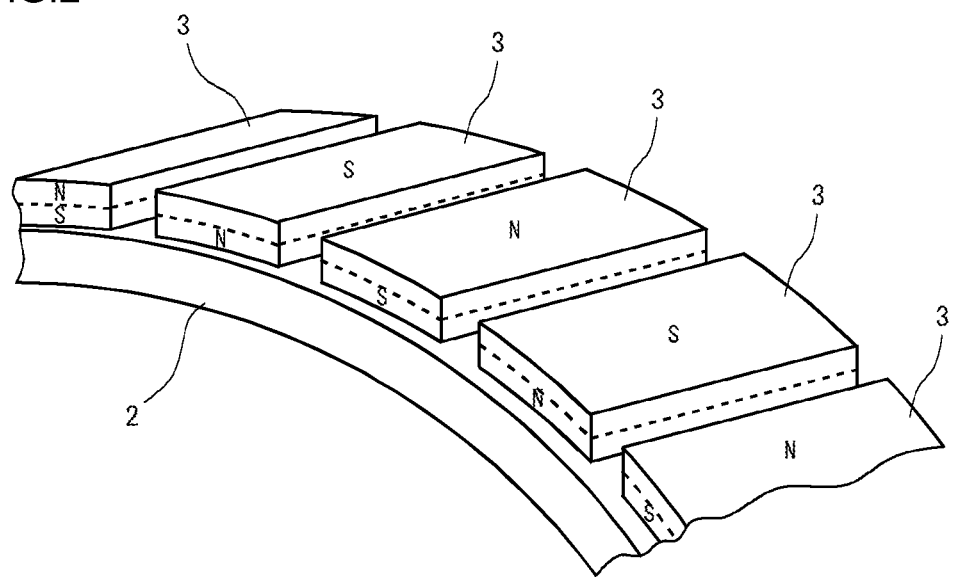
FIG. 2 is a perspective view showing the arrangement of magnets in a conventional drum-type deceleration device.
Figure 3:
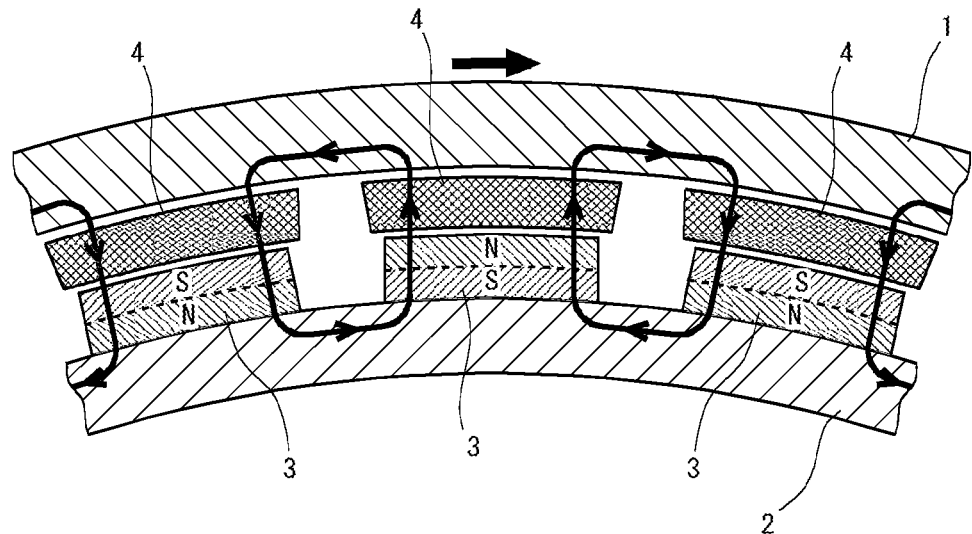
FIG. 3 is a cross-sectional view showing the generation status of magnetic circuits in a braking state in the conventional deceleration device shown in FIG. 2.
Figure 4:
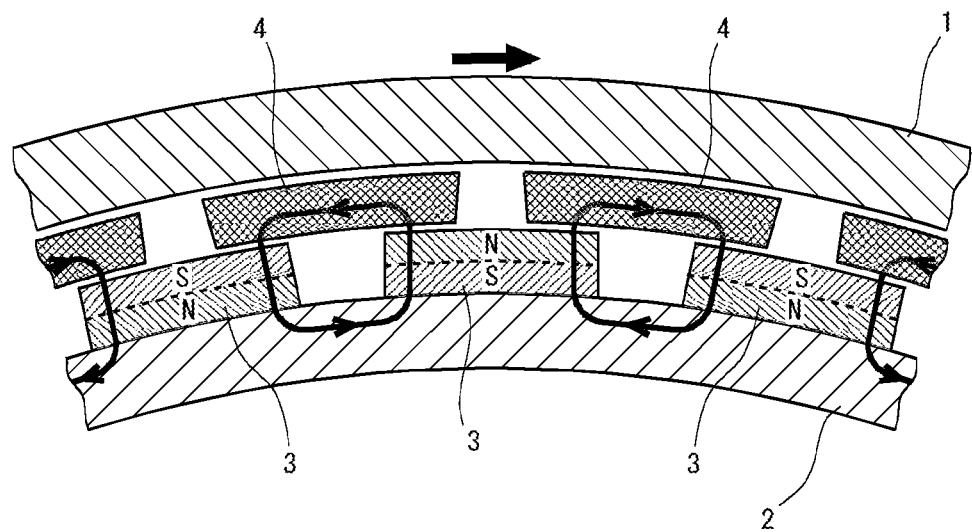
FIG. 4 is a cross-sectional view showing the generation status of magnetic circuits in a non-braking state in the conventional deceleration device shown in FIG. 2.

Embodiments of the present invention will hereinafter be described. In the following, some embodiments of the present invention will be described, but the present invention is not to be considered limited to the embodiments. In the following description, some specific values and materials will be presented as examples, but the present invention is not limited by the values and materials.

An eddy current deceleration device according to the present invention includes a cylindrical brake member, a plurality of permanent magnets, a cylindrical magnet holder, and a switching mechanism. The brake member is fixed to a rotary shaft. The plurality of permanent magnets are disposed to face the inner peripheral surface or the outer peripheral surface of the brake member with a gap and are arrayed in a circumferential direction throughout the whole circumference of a circle around the rotary shaft. The cylindrical magnet holder holds the plurality of magnets. The switching mechanism switches between a braking state and a non-braking state.

The plurality of permanent magnets are disposed between the brake member and the magnet holder. The plurality of permanent magnets include primary magnets and secondary magnets that are arrayed alternatively in the circumferential direction. The magnetic poles of each of the primary magnets are arranged in a radial direction from the axis of the rotary shaft, and two circumferentially adjacent ones of the primary magnets have opposite magnetic pole arrangements. The magnetic poles of each of the secondary magnets are arranged in the circumferential direction. When viewed on the surface facing the brake member, the north poles of the primary magnets are circumferentially adjacent to the north poles of the secondary magnets, and the south poles of the primary magnets are circumferentially adjacent to the south poles of the secondary magnets. The magnet holder is ferromagnetic. This deceleration device is capable of generating high braking torque.

Typically, when viewed on the surface facing the magnetic holder, the north poles of the primary magnets are circumferentially adjacent to the south poles of the secondary magnets, and the south poles of the primary magnets are circumferentially adjacent to the north poles of the secondary magnets.

In the deceleration device according to the present invention, a non-magnetic member may be disposed between each of the secondary magnets and the magnetic holder. This allows generation of higher braking torque. In an example of this structure, the secondary magnets are indirectly held by the magnet holder via the primary magnets. There is no limit to the non-magnetic member as long as it brings about an advantageous effect of the present invention. Examples of the non-magnetic member include a non-magnetic organic material, a non-magnetic inorganic material and a gas (for example, atmospheric air). The non-magnetic member may be non-magnetic metal (for example, aluminum, non-magnetic stainless steel or the like).

In the deceleration device according to the present invention, a space may be made between each of the secondary magnets and the magnetic holder. In this case, the non-magnetic member may be the gas (for example, atmospheric air) in the space. The space between each of the secondary magnets and the magnetic holder may be a recessed portion formed in the magnet holder, at a portion facing the secondary magnet.

In the deceleration device including such non-magnetic members, each of the non-magnetic members may have a rounded-off corner in the side farther from the brake member. This prevents the magnetic flux flowing around each of the non-magnetic members from exhibiting a turbulent behavior at the corner of the non-magnetic member. In an example of this structure, a recessed portion is formed in the magnet holder, at each portion facing each of the secondary magnets, and the corners at the bottom of the recessed portion are rounded off.

In the deceleration device according to the present invention, the dimension in the circumferential direction of the secondary magnets may decrease with decreasing distance from the brake member. In this case, the dimension in the circumferential direction of the primary magnets may increase with decreasing distance from the brake member.

The deceleration device according to the present invention may include a specified switching mechanism. A first exemplary switching mechanism and a second exemplary switching mechanism will be described below. The first exemplary switching mechanism has the following configuration. The array of primary and secondary magnets is divided into a first row and a second row, each of the rows extending in the circumferential direction, and the magnet holder is divided into a first section and a second section holding the first row of magnets and the second row of magnets, respectively. In the gap between the brake member and the array of magnets, a plurality of ferromagnetic plate-like switches are arrayed in the circumferential direction such that the placement angles of these switches are the same as the placement angles of the primary magnets. Either the first section or the second section of the magnet holder is rotatable around the rotary shaft. By the rotation, the deceleration device is switched between a braking state and a non-braking state. Thus, the first exemplary switching mechanism includes a drive unit that rotates either the first section or the section of the magnet holder, and plate-like switches.

In the second exemplary switching mechanism has the following configuration. The array of primary and secondary magnets is divided into a first row, a second row and a third row, each of the rows extending in the circumferential direction, and the magnet holder is divided into a first section, a second section and a third section for the first row of magnets, the second row of magnets and the third row of magnets, respectively. In the gap between the brake member and the array of magnets, a plurality of ferromagnetic plate-like switches are arrayed in the circumferential direction such that the placement angles of these switches are the same as the placement angles of the primary magnets. Either the first and the third sections of the magnet holder or the second section of the magnet holder is rotatable around the rotary shaft. By the rotation, the deceleration device is switched between a braking state and a non-braking state. Thus, the mechanism with this configuration serves as a switching mechanism. The second exemplary switching mechanism includes a drive unit that rotates either the first and the third sections of the magnet holder or the second section of the magnet holder, and plate-like switches. The use of plate-like switches provides an advantageous effect that heat generated in the brake member by eddy currents becomes less likely to be transferred to the permanent magnets.

In the deceleration device including the first or the second exemplary switching mechanism, the switching mechanism may be operated as follows. In the non-braking state, the magnets may be positioned such that adjacent primary magnets in an axial direction along the axis of the rotary shaft have opposite magnetic pole arrangements and such that adjacent secondary magnets in the axial direction have opposite magnetic pole arrangements. In the braking state, the magnets may be positioned such that adjacent primary magnets in the axial direction have the same magnetic pole arrangement and such that adjacent secondary magnets in the axial direction have the same magnetic pole arrangement.

In the deceleration device according to the present invention, the length (dimension in the circumferential direction) of each of the plate-like switches may be the same as the length of each of the primary magnets.

In the deceleration device according to the present invention, the magnet holder may be movable in the axial direction along the axis of the rotary shaft, and the switching between a braking state and a non-braking state may be performed by the movement of the magnet holder. In this case, the switching mechanism includes a drive unit that moves the magnet holder in the axial direction.

In the deceleration device according to the present invention, the length (dimension in the circumferential direction) of each of the plate-like switches may be 1.5 to 9 times the length of each of the primary magnets.

Eddy current deceleration devices according to some embodiments of the present invention will hereinafter be described with reference to the drawings.

First Embodiment

Figure 5:
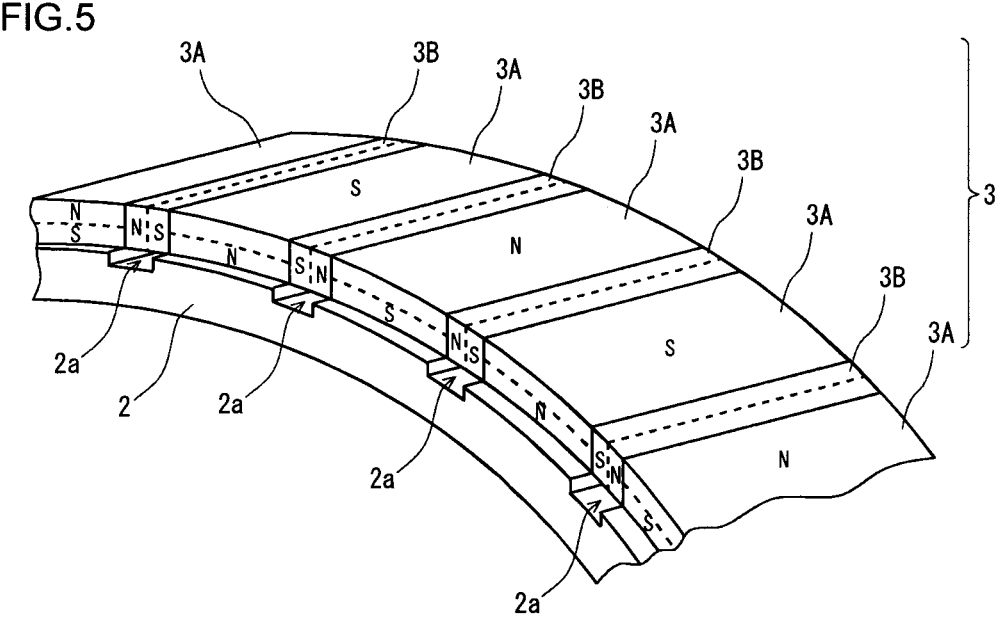
FIG. 5 is a perspective view showing the arrangement of magnets in a deceleration device according to a first embodiment.
Figure 6:
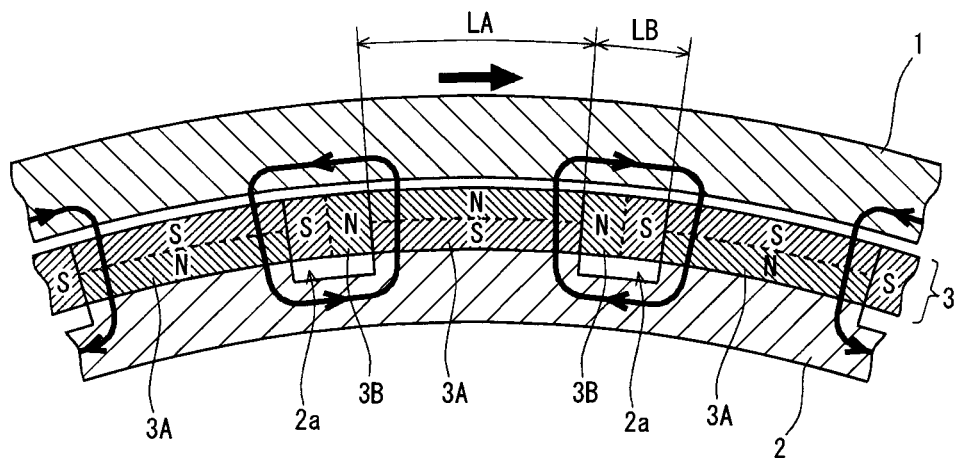
FIG. 6 is a cross-sectional view showing the generation status of magnetic circuits in a braking state in the deceleration device according to the first embodiment.
Figure 7:
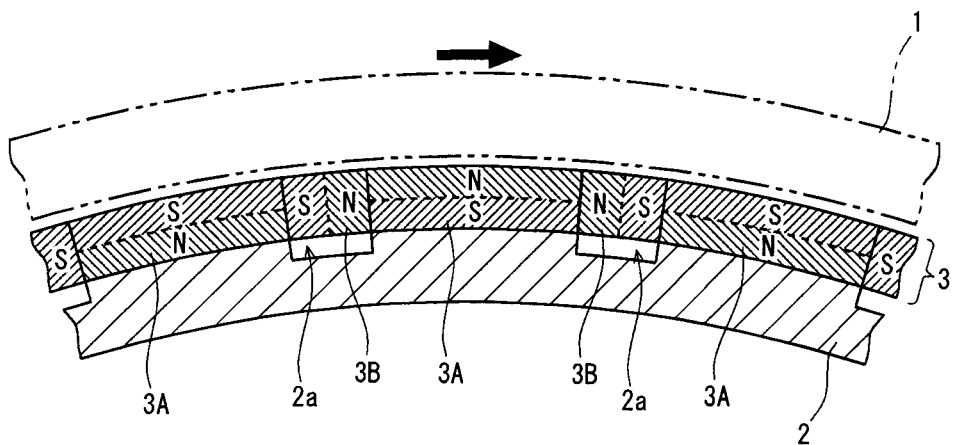
FIG. 7 is a cross-sectional view showing the generation status of magnetic circuits in a non-braking state in the deceleration device according to the first embodiment.

FIG. 5 is a perspective view showing the arrangement of magnets in a deceleration device according to a first embodiment. FIGS. 6 and 7 are cross-sectional views showing the generation status of magnetic circuits in the deceleration device according to the first embodiment. FIG. 6 shows a braking state, and FIG. 7 shows a non-braking state. The configuration of the deceleration device according to the first embodiment is based on the configuration of the drum-type deceleration device shown in FIG. 1. The same applies to a second and a third embodiment which will be described later. The parts of the deceleration device according to the first embodiment that are the same as the parts of the drum-type deceleration device shown in FIG. 1 may not be described repeatedly.

As with the deceleration device shown in FIG. 1, the deceleration device according to the first embodiment includes a brake drum (brake member) 1 and a magnet holding ring (magnet holder) 2. The brake drum 1 is fixed to a rotary shaft, and rotates along with rotation of the rotary shaft. The magnet holding ring 2 is made of a ferromagnetic material. In the deceleration device according to the first embodiment, as shown in FIGS. 5 to 7, the plurality of magnets 3 includes primary magnets 3A and secondary magnets 3B. The primary magnets 3A and the secondary magnets 3B are arranged on the outer peripheral surface of the magnet holding ring 2. The primary magnets 3A and the secondary magnets 3B are alternately arranged in a circumferential direction throughout the whole circumference of a circle around the rotary shaft 10. In other words, one secondary magnet 3B is disposed between two circumferentially adjacent primary magnets 3A. The surfaces of the permanent magnets 3 may be covered by a resin or carbon sheet.

The plurality of permanent magnets 3 held by the magnet holding ring 2 are located between the brake drum 1 and the magnet holding ring 2. Thus, the inner peripheral surface of the brake drum 1 and the outer peripheral surface of the magnet holding ring 2 face each other across the plurality of permanent magnets 3.

There are no limits to the materials of the brake drum 1, the magnet holding ring 2, the permanent magnets 3 and plate-like switches 4 to be described below, and the materials of these members of a conventional eddy current deceleration device may be used. For example, the ferromagnetic material forming the magnet holding ring 2 may be ferromagnetic metal which will be described later.

The primary magnets 3A are arrayed in the circumferential direction at intervals. Each of the secondary magnets 3B is disposed between the circumferentially arrayed primary magnets 3A. Each of the primary magnets 3A is laid such that the magnetic poles (the north pole and the south pole) thereof are arranged in a radial direction from the axis of the rotary shaft 10. In other words, the direction from the north pole to the south pole of one primary magnet 3A is along the radial direction. The magnetic pole (N-S) arrangements of two circumferentially adjacent primary magnets 3A are opposite to each other. Each of the secondary magnets 3B is laid such that the magnetic poles (N and S) thereof are arranged in the circumferential direction of a circle around the rotary shaft 10. In other words, the direction from the north pole to the south pole of one secondary magnet 3B is along the circumferential direction. The magnetic pole (N-S) arrangements of two circumferentially adjacent secondary magnets 3B are opposite to each other.

The primary magnets 3A and the secondary magnets 3B are arranged as shown in FIG. 6. When viewed on the surface facing the brake member 1, the north poles of the primary magnets 3A are circumferentially adjacent to the north poles of the secondary magnets 3B, and the south poles of the primary magnets 3A are circumferentially adjacent to the south poles of the secondary magnets 3B. When viewed on the surface facing the magnetic holding ring 2, on the other hand, the north poles of the primary magnets 3A are circumferentially adjacent to the south poles of the secondary magnets 3B, and the south poles of the primary magnets 3A are circumferentially adjacent to the north poles of the secondary magnets 3B.

In a preferred example, at the border between a primary magnet 3A and a secondary magnet 3B, the surface of the primary magnet 3A facing the brake drum 1 and the surface of the secondary magnet 3B facing the brake drum 1 are on the same level, and the surface of the primary magnet 3A facing the magnet holding ring 2 and the surface of the secondary magnet 3B facing the magnet holding ring 2 are on the same level.

According to the first embodiment, the magnet holding ring 2 is supported by the stator support 7 and is movable in the axial direction along the axis of the rotary shaft 10. To the magnet holding ring 2, a drive unit such as an air cylinder, an electric actuator or the like is connected. For switching to a braking state or a non-braking state, the magnet holding ring 2, and the magnets 3A and 3B are moved together in the axial direction by the drive unit. Thereby, the deceleration device can be switched between the braking state where the primary magnets 3A and the secondary magnets 3B face the inner peripheral surface of the brake drum 1 (see FIG. 6) and the non-braking state where the primary magnets 3A and the secondary magnets 3B are pulled out from the brake drum 1 (see FIG. 7). Thus, the deceleration device according to the first embodiment employs, as a switching mechanism for switching between a braking state and a non-braking state, a structure in which the magnet holding ring 2 is movable in the axial direction. A switching mechanism having such a structure will hereinafter be referred to as an "axial motion switching mechanism".

The material of the brake drum 1, especially the material of the inner peripheral surface thereof to face the magnets 3A and 3B is a conductive material. The conductive material is, for example, a ferromagnetic metal material (for example, carbon steel, cast iron or the like), a feebly magnetic metal material (for example, ferrite stainless steel or the like) or a non-magnetic metal material (for example, aluminum alloy, austenite stainless steel, copper alloy or the like).

In the non-braking state, the axial motion switching mechanism operates to keep the primary magnets 3A and the secondary magnets 3B outside the brake drum 1 as shown in FIG. 7. In other words, the magnets 3A and 3B are kept away from the inner peripheral surface of the brake drum 1. In this state, the magnetic fluxes from the magnets 3A and 3B (the magnetic fields of the magnets 3A and 3B) do not reach the brake drum 1. Accordingly, no magnetic circuits are generated between the magnets 3A and 3B, and the brake drum 1. Then, no eddy currents are generated in the inner peripheral surface of the brake drum 1, and no braking torque acts on the brake drum 1 that is rotating together with the rotary shaft 10.

For switching to the braking state, the axial motion switching mechanism operates to move the magnetic holding ring 2 to the inside of the brake drum 1. Thereby, as shown in FIG. 6, the magnets 3A and 3B are positioned to concentrically overlap the brake drum 1, and the magnets 3A and 3B are put into a state to face the inner peripheral surface of the brake drum 1. Then, the magnetic fluxes from the magnets 3A and 3B (the magnetic fields of the magnets 3A and 3B) are as follows.

Regarding two adjacent primary magnets (a first primary magnet and a second primary magnet) 3A, the magnetic flux outgoing from the north pole of the first primary magnet 3A reaches the brake drum 1 facing the first primary magnet 3A. On the magnetic flux, the magnetic fluxes outgoing from the north poles of the secondary magnets 3B that are in contact with the first primary magnet 3A are superimposed. The magnetic flux that has reached the brake drum 1 reaches the south pole of the second primary magnet 3A. The magnetic flux outgoing from the north pole of the second primary magnet 3A reaches the south pole of the first primary magnet 3A via the magnet holding ring 2.

Thus, the circumferentially adjacent primary magnets 3A form a strong magnetic circuit across the adjacent primary magnets 3A, the secondary magnet 3B that is in contact with the primary magnets 3A, the magnet holding ring 2 and the brake drum 1. Such magnetic circuits are formed throughout the whole circumference such that adjacent magnetic fluxes are in opposite directions. FIG. 6 schematically indicates the magnetic circuits with heavy lines and indicates the directions of magnetic fluxes with arrows on the heavy lines.

While there is a rotational speed difference between the magnets 3A and 3B, and the brake drum 1, when the magnetic fields of the magnets 3A and 3B act on the brake drum 1, eddy currents are generated in the inner peripheral surface of the brake drum 1. Interactions between the eddy currents and the magnetic flux density from the magnets 3A and 3B cause braking torque to act on the brake drum 1, which is rotating together with the rotary shaft 10, in the reverse direction to the rotational direction, according to Fleming's left-hand rule.

In the deceleration device according to the first embodiment, in the braking state, not only do principal magnetic fluxes outgoing from the primary magnets 3A reach the brake drum 1, but the magnetic fluxes from the secondary magnets 3B are superimposed thereon and also reach the brake drum 1. Accordingly, larger eddy currents are generated. This allows generation of high braking torque.

The first embodiment does not necessarily require plate-like switches 4 shown in FIG. 1. Instead of the plate-like switches 4, plate-like ferromagnetic pole pieces may be fixed on the surfaces of the primary magnets 3A. In a case where the plate-like switches 4 are provided, in the braking state, the plate-like switches 4 shall be positioned in the gap between the primary magnets 3A and the brake drum 1 to lie over the primary magnets 3A.

In an example shown in FIGS. 5 to 7, the magnet holding ring 2 has grooves (recessed portions) at portions facing the secondary magnets 3B, and the grooves make spaces 2a between the secondary magnets 3B and the magnet holding ring 2. It is preferred that there are such spaces 2a between the secondary magnets 3B and the magnet holding ring 2. The reason is as follows. When spaces 2a are made between the second magnets 3B and the magnet holding ring 2, the spaces 2a are filled with atmospheric air (a non-magnetic material) and serve as non-magnetic members. Then, the magnetic fluxes from the secondary magnets 3B toward the magnet holding ring 2 are suppressed by the spaces 2a. In response, the magnetic fluxes from the secondary magnets 3B to be superimposed on the magnetic fluxes from the primary magnets 3A toward the brake drum 1 increase. Consequently, the magnetic flux density toward the brake drum 1 increases, thereby resulting in an increase of the braking torque.

In a preferred example, as shown in FIG. 6, the non-magnetic members (spaces 2a) are in such positions to entirely cover the surfaces of the secondary magnets 3B facing the magnet holding ring 2 and not to cover the surfaces of the primary magnets 3A facing the magnet holding ring 2. This arrangement allows the secondary magnets 3B to exert a more potent effect.

The non-magnetic members (spaces 2a) may be substantially in the shape of a rectangular parallelepiped as shown in FIGS. 5 to 7. More specifically, the non-magnetic members may have a shape obtained by bending a rectangular parallelepiped along the circumference of a circle around the rotary shaft.

As shown in FIG. 6, the length LA of the primary magnets 3A is desirably 1.5 to 9 times the length LB of the secondary magnets 3B. The reason is as follows. If the length LA of the primary magnets 3A is too short as compared with the length LB of the secondary magnets 3B, the principal magnetic fluxes outgoing from the primary magnets 3A will be too small, which will result in generation of low torque. On the other hand, if the length LA of the primary magnets 3A is too long as compared with the length LB of the secondary magnets 3B, the magnetic fluxes outgoing from the secondary magnets 3A to be superimposed on the principal magnetic fluxes from the primary magnets 3A will be too small, which will also result in generation of low torque. Thus, whether the length LA of the primary magnets 3A is too short or too long as compared with the length LB of the secondary magnets 3B, the generated braking torque will be low. More desirably, the length LA of the primary magnets 3A is two to four times the length LB of the secondary magnets 3B. Here, the length of the magnets 3A and the length of the magnets 3B are dimensions thereof in the circumferential direction along the circumference of a circle around the rotary shaft.

The inner peripheral surface of the brake drum 1 facing the magnets 3A and 3B is preferably plated with copper. The magnets 3A and 3B preferably have the greatest possible thickness within the allowable range in view of design. The magnetic fields of thicker magnets 3A and 3B allow generation of larger eddy currents, thereby resulting in generation of higher braking torque.

Second Embodiment

Figure 8:
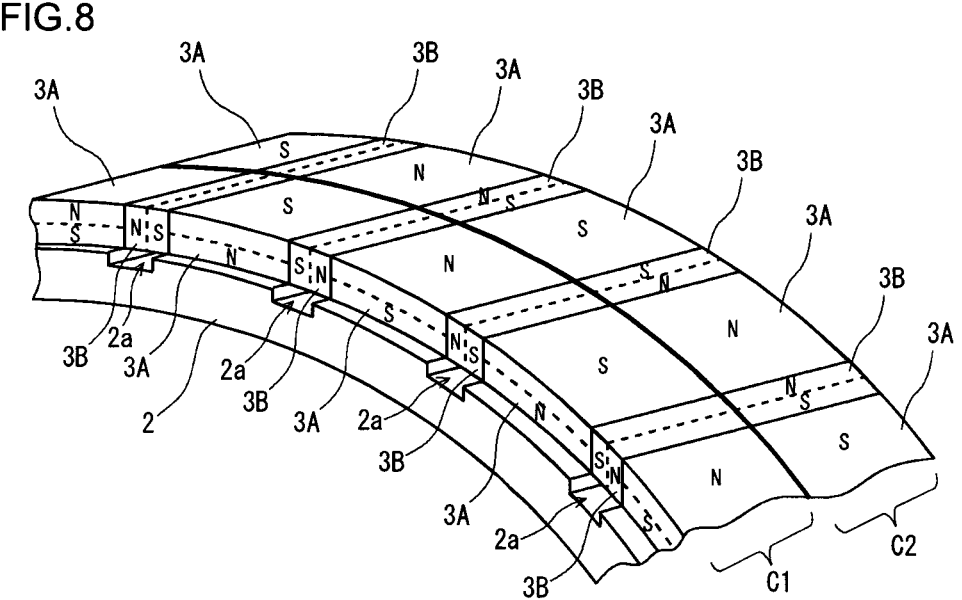
FIG. 8 is a perspective view showing the arrangement of magnets in a deceleration device according to a second embodiment.
Figure 9A:
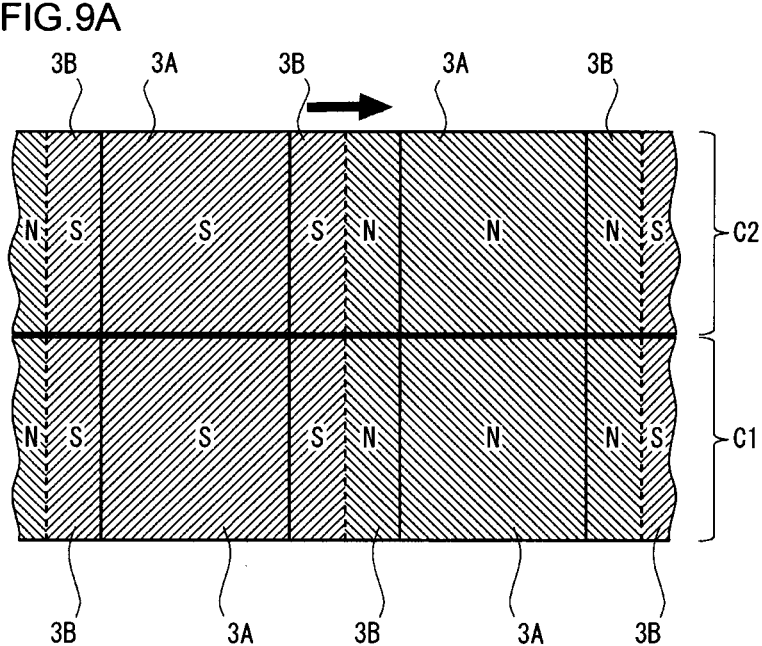
FIG. 9A is a sectional view along a circumferential direction, showing the generation status of magnetic circuits in a braking state in the deceleration device according to the second embodiment.
Figure 9B:
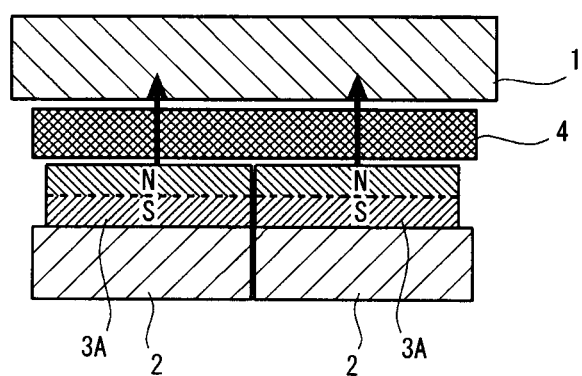
FIG. 9B is a longitudinal sectional view showing the generation status of magnetic circuits in the braking state in the deceleration device according to the second embodiment.
Figure 9C:
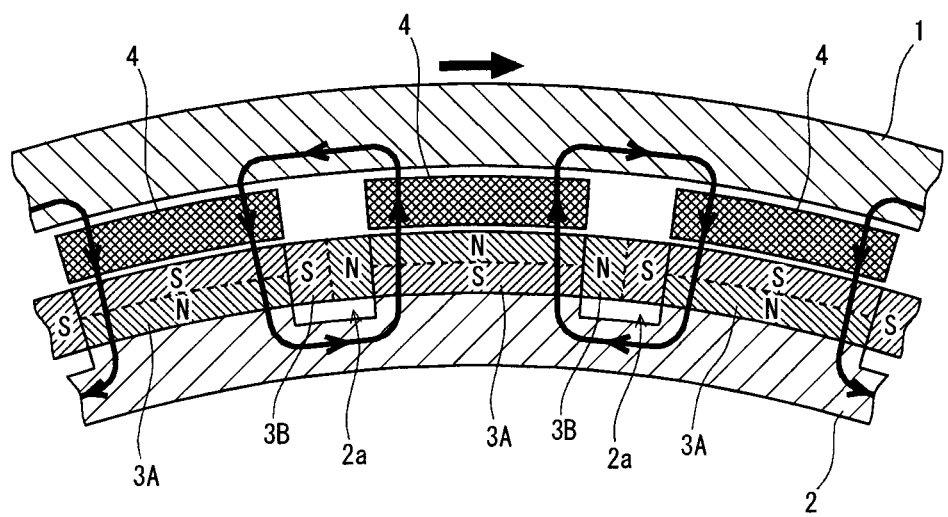
FIG. 9C is a cross-sectional view showing the generation status of magnetic circuits in the braking state in the deceleration device according to the second embodiment.
Figure 10A:
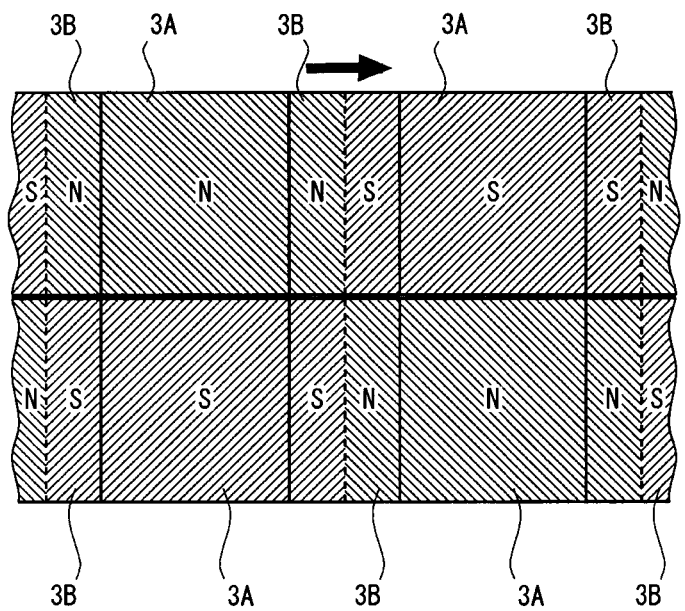
FIG. 10A is a sectional view along the circumferential direction, showing the generation status of magnetic circuits in a non-braking state in the deceleration device according to the second embodiment.
Figure 10B:
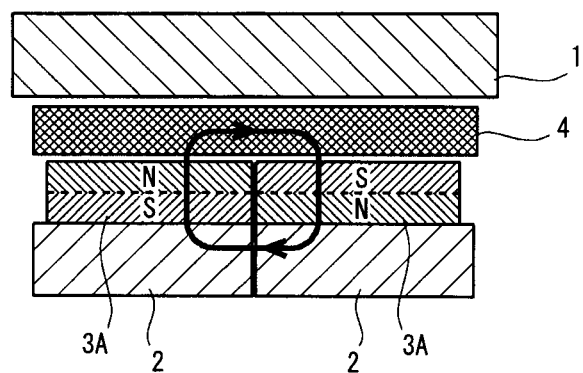
FIG. 10B is a longitudinal sectional view showing the generation status of magnetic circuits in the non-braking state in the deceleration device according to the second embodiment.
Figure 10C:
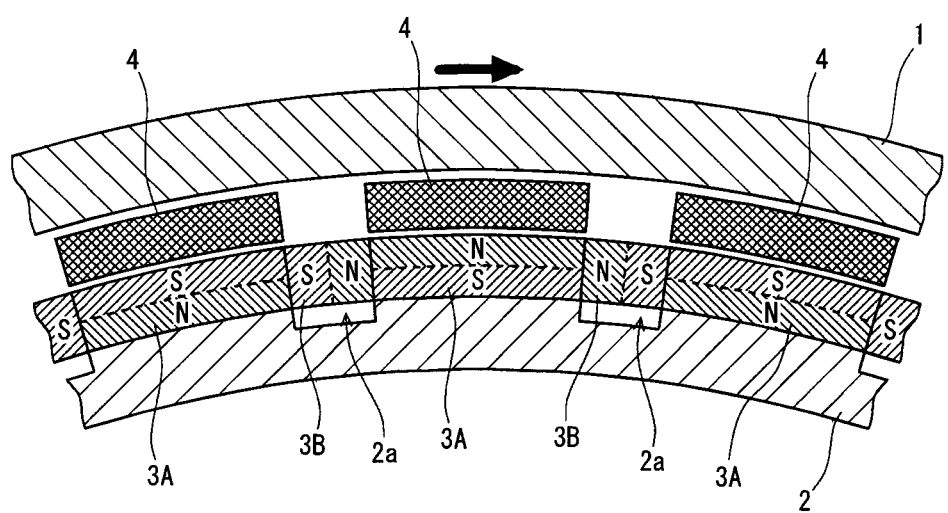
FIG. 10C is a cross-sectional view showing the generation status of magnetic circuits in the non-braking state in the deceleration device according to the second embodiment.

FIG. 8 is a perspective view showing the arrangement of magnets in a deceleration device according to a second embodiment. FIGS. 9A to 9C show the generation status of magnetic circuits in a braking state in the deceleration device according to the second embodiment. FIGS. 10A to 10C show the generation status of magnetic circuits in a non-braking state in the deceleration device. FIGS. 9A and 10A are sectional views along a circumferential direction. FIGS. 9B and 10B are longitudinal sectional views of the deceleration devices. FIGS. 9C and 10C are cross-sectional views of the deceleration devices. The deceleration device according to the second embodiment is a modification of the first embodiment, and the second embodiment differs from the first embodiment in the switching mechanism.

The deceleration device according to the second embodiment includes a two-row rotation switching mechanism as a switching mechanism for switching between a braking state and a non-braking state. Specifically, the primary magnets 3A, the secondary magnets 3B and the magnet holding ring 2 are located inside the brake drum 1 at all times and are not movable in the axial direction along the axis of the rotary shaft 10. The array of magnets 3A and 3B is divided into a first row (C1) and a second row (C2), each of the rows extending in the circumferential direction along the circumference of a circle around the rotary shaft 10. The magnet holding ring 2 is divided into a first section and a second section holding the first row of magnets and the second row of magnets, respectively. The first row of magnets 3A and 3B and the first section of the magnet holding ring 2, and the second row of magnets 3A and 3B and the second section of the magnet holding ring 2 are located with a narrow gap in between, and are independent of each other. The length (dimension in the axial direction along the axis of the rotary shaft 10) of the magnets 3A in the first row is nearly equal to the length of the magnets 3A in the second row, and the length of the magnets 3B in the first row is nearly equal to the length of the magnets 3B in the second row (see FIGS. 8, 9A, 9B, 10A and 10B).

In the gap between the brake drum 1 and the primary magnets 3A, a plurality of plate-like switches 4 are arrayed throughout the whole circumference of a circle around the rotary shaft 10. Unlike the array of magnets 3A, 3B and the magnetic holding ring 2, the array of switches 4 is not divided. The placement angles of the switches 4 are the same as the placement angles of the primary magnets 3A. Each of the switches 4 has a size as follows. The dimension of the switch 4 in the circumferential direction along the circumference of a circle around the rotary shaft 3 is nearly equal to that of each of the primary magnets 3A (see FIGS. 9C and 10C). The dimension of the switch 4 in the axial direction along the axis of the rotary shaft 3 is nearly equal to the total of that of a primary magnet 3A in the first row and that of a primary magnet 3A in the second row (see FIGS. 9B and 10B).

As shown in FIG. 1, both sides of the respective switches 4 are held by the switch holding ring 5. The switch holding ring 5 is fixed to the stator support 7.

Out of the first and the second sections of the magnetic holding ring 2, the first section of the magnetic holding ring 2 holding the first row of magnets is fixed to the rotor support 7. The second section of the magnetic holding ring 2 holding the second row of magnets is supported by the stator support 7 and is rotatable around the rotary shaft 10. A drive unit (not shown) such as an air cylinder, an electric actuator or the like is connected to the second section of the magnetic holding ring 2. For switching to a braking state or a non-braking state, the second section of the magnet holding ring 2 and the second row of magnets 3A and 3B are rotated together by operation of the drive unit. In this way, the deceleration device can be switched between a braking state and a non-braking state.

In the braking state, a primary magnet 3A in the first row and a primary magnet 3A in the second row that have the same magnetic pole arrangement are aligned in the axial direction along the axis of the rotary shaft 10, and a secondary magnet 3B in the first row and a secondary magnet 3B in the second row that have the same magnetic pole arrangement are aligned in the axial direction (see FIGS. 9A and 9B). In the non-braking state, on the other hand, a primary magnet 3A in the first row and a primary magnet 3A in the second row that have opposite magnetic pole arrangements are aligned in the axial direction, and a secondary magnet 3B in the first row and a secondary magnet 3B in the second row that have opposite magnetic pole arrangements are aligned in the axial direction (see FIGS. 10A and 10B). In either state, the switches 4 are located over the first primary magnets 3A (see FIGS. 9C and 10C).

In the non-braking state, the two-row rotation switching mechanism operates to keep the magnets 3A and 3B such that a primary magnet 3A in the first row and a primary magnet 3A in the second row that have opposite magnetic pole arrangements are in alignment with each other as axially adjacent primary magnets 3A and such that a secondary magnet 3B in the first row and a secondary magnet 3B in the second row that have opposite magnetic pole arrangements are in alignment with each other as axially adjacent secondary magnets 3B, as shown in FIGS. 10A to 10C. In this state, the magnetic fluxes from the magnets 3A and 3B (the magnetic fields of the magnets 3A and 3B) are as follows.

From a longitudinal sectional view, a magnetic circuit as shown in FIG. 10B is formed. Regarding two axially adjacent primary magnets 3A (a first primary magnet 3A and a second primary magnet 3A) in the first row and in the second row, respectively, the magnetic flux outgoing from the north pole of the first primary magnet 3A reaches the south pole of the second primary magnet 3A via the switch 4 located over the first and the second primary magnets 3A. On the magnetic flux, the magnetic fluxes outgoing from the north poles of the secondary magnets 3B that are in contact with the first primary magnet 3A are superimposed. The magnetic flux outgoing from the north pole of the second primary magnet 3A reaches the south pole of the first primary magnet 3A via the magnet holding ring 2. Thus, the axially adjacent primary magnets 3A form a strong magnetic circuit across the adjacent primary magnets 3A, the secondary magnet 3B that is in contact with the primary magnets 3A, the magnet holding ring 2 and the switch 4. Such magnetic circuits are formed throughout the whole circumference such that the directions of adjacent magnetic fluxes are opposite to each other.

At the time, from a cross-sectional view along the circumferential direction, as shown in FIG. 10C, no magnetic circuits are formed. This is because strong magnetic circuits are formed in longitudinal sections along the axial direction.

In sum, in the non-braking state, no magnetic circuits are formed between the magnets 3A, 3B and the brake drum 1. Then, no eddy currents are generated in the inner peripheral surface of the brake drum 1, and no braking torque acts on the brake drum 1 that is rotating together with the rotary shaft 10.

In the braking state, on the other hand, as shown in FIGS. 9A to 9C, the two-row rotation switching mechanism operates to keep the magnets 3A and 3B such that a primary magnet 3A in the first row and a primary magnet 3A in the second row that have the same magnetic pole arrangement are in alignment with each other as axially adjacent primary magnets 3A and such that a secondary magnet 3A in the first row and a secondary magnet 3B in the second row that have the same magnetic pole arrangement are completely in alignment with each other as axially adjacent secondary magnets 3B. In this state, the magnetic fluxes from the magnets 3A and 3B (the magnetic fields of the magnets 3A and 3B) are as follows.

Regarding two axially adjacent primary magnets 3A (a first primary magnet 3A and a second primary magnet 3A) in the first row and in the second row, respectively, the magnetic flux outgoing from the north pole of the first primary magnet 3A passes through the switch 4 located over the first primary magnet 3A and reaches the brake drum 1. On the magnetic flux, the magnetic fluxes outgoing from the north poles of the secondary magnets 3B that are in contact with the first primary magnet 3A are superimposed. The magnetic flux that has reached the brake drum 1 reaches the south pole of the second primary magnet 3A through the switch 4. The magnetic flux outgoing from the second primary magnet 3A reaches the south pole of the first primary magnet 3A via the magnet holding ring 2.

Thus, the circumferentially adjacent primary magnets 3A form a strong magnetic circuit across the first primary magnets 3A, the secondary magnet 3B that is in contact with the primary magnets 3A, the magnet holding ring 2, the switch 4 located over the primary magnets 3A, and the brake drum 1. Such magnetic fields are formed throughout the whole circumference such that the directions of adjacent magnetic fluxes are opposite to each other.

In the second embodiment, in the braking state, strong magnetic circuits are formed almost in the same manner as in the first embodiment. Accordingly, the deceleration device according to the second embodiment has the same advantageous effects as the first embodiment. Especially the second-row rotation switching mechanism employed in the second embodiment allows the deceleration device to have a short entire length, compared with the deceleration device according to the first embodiment employing the axial motion switching mechanism. Accordingly, the second-row rotation switching mechanism is effective to downsize the device.

It is possible to employ the above-mentioned single-row rotation switching mechanism, in which the array of magnets 3A and 3B is not divided into two rows and the magnet holding ring 2 is not divided into two sections, in the deceleration device according to the second embodiment. In a case where the single-row rotation switching mechanism is employed, as compared with the case where the two-row rotation switching mechanism is employed, the generation status of magnetic circuits in the braking state is almost the same, but the generation status of magnetic circuits in the non-braking state is different. In a case where the single-row rotation switching mechanism is employed, specifically, in the non-braking state, the switches 4 are kept in such positions that each of the switches 4 lies across two circumferentially adjacent primary magnets 3A. In this state, no magnetic circuits are formed in longitudinal sections along the axial direction, and magnetic circuits are formed only in cross-sections along the circumferential direction. In this case, the magnetic fluxes from the magnets 3A and 3B concentrate, and the magnetic fluxes partly leak from the switches 4 to the brake drum 1 even in the non-braking state. Accordingly, in the non-braking state, magnetic leakage loss torque is generated.

In a case where the two-row rotation switching mechanism is employed as in the second embodiment, on the other hand, magnetic circuits are formed in longitudinal sections along the axial direction in the non-braking state. Then, in the non-braking state, the magnetic fluxes from the magnets 3A and 3B scatter, and magnetic leakage from the switches 4 to the brake drum 1 is prevented. Accordingly, generation of magnetic leakage loss torque can be prevented in the non-braking state. Therefore, employing the two-row rotation switching mechanism is preferable to employing the single-row rotation switching mechanism.

Third Embodiment

Figure 11:
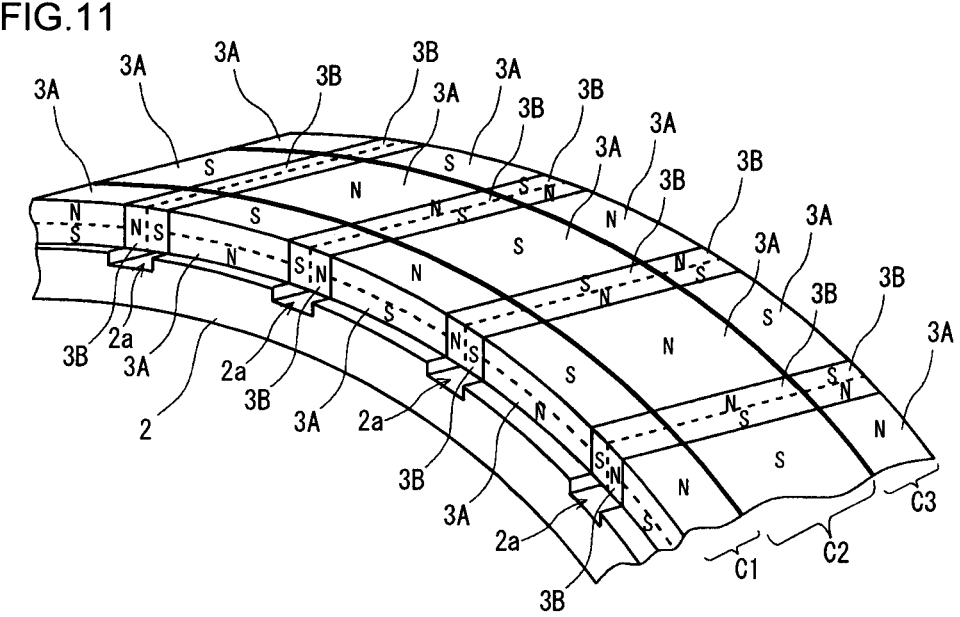
FIG. 11 is a perspective view showing the arrangement of magnets in a deceleration device according to a third embodiment.
Figure 12A:
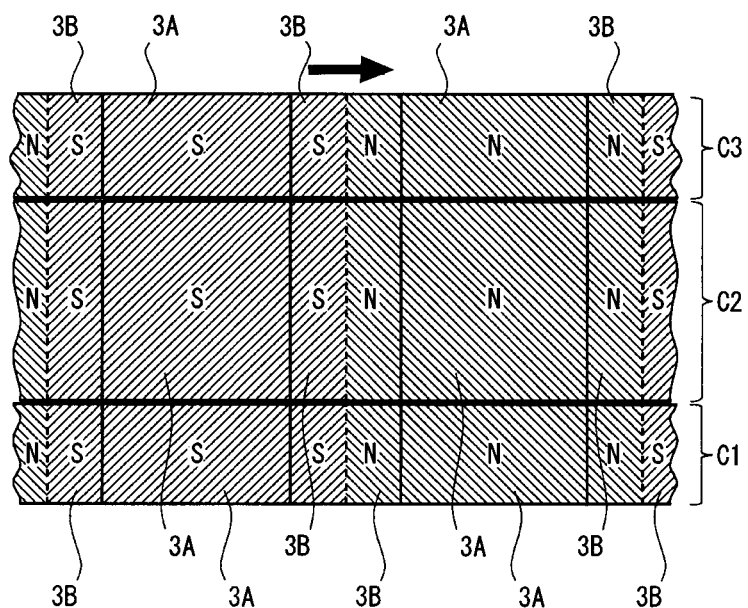
FIG. 12A is a sectional view along a circumferential direction, showing the generation status of magnetic circuits in a braking state in the deceleration device according to the third embodiment.
Figure 12B:
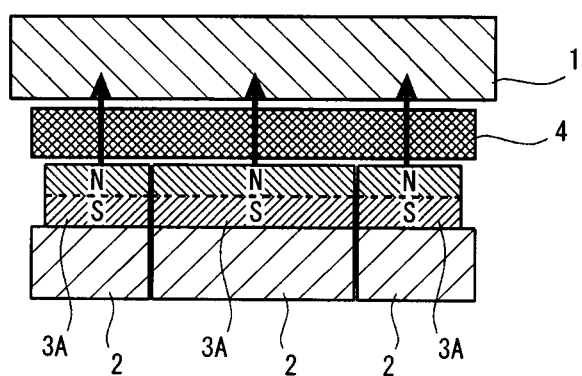
FIG. 12B is a longitudinal sectional view showing the generation status of magnetic circuits in the braking state in the deceleration device according to the third embodiment.
Figure 12C:
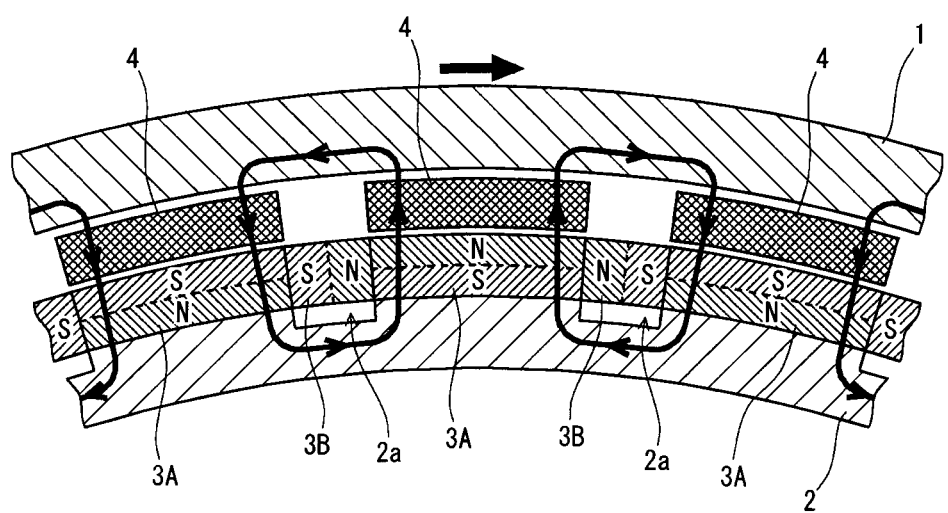
FIG. 12C is a cross-sectional view showing the generation status of magnetic circuits in the braking state in the deceleration device according to the third embodiment.
Figure 13A:
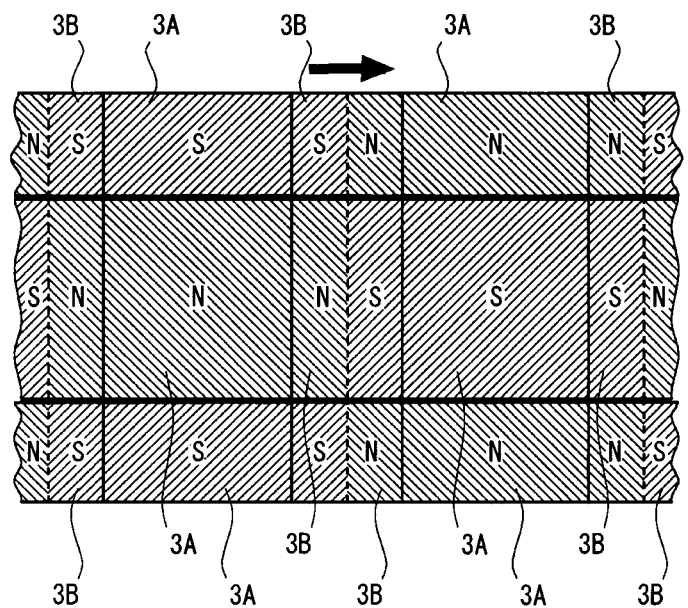
FIG. 13A is a sectional view along the circumferential direction, showing the generation status of magnetic circuits in a non-braking state in the deceleration device according to the third embodiment.
Figure 13B:
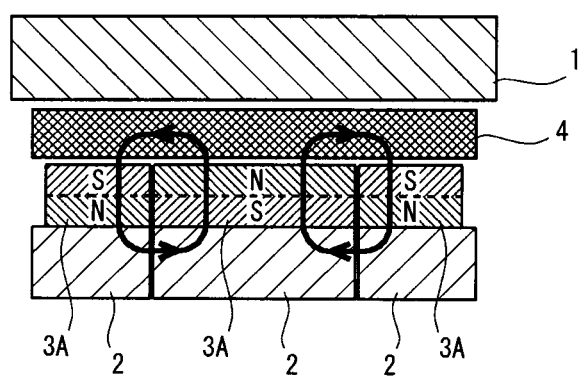
FIG. 13B is a longitudinal sectional view showing the generation status of magnetic circuits in the non-braking state in the deceleration device according to the third embodiment.
Figure 13C:
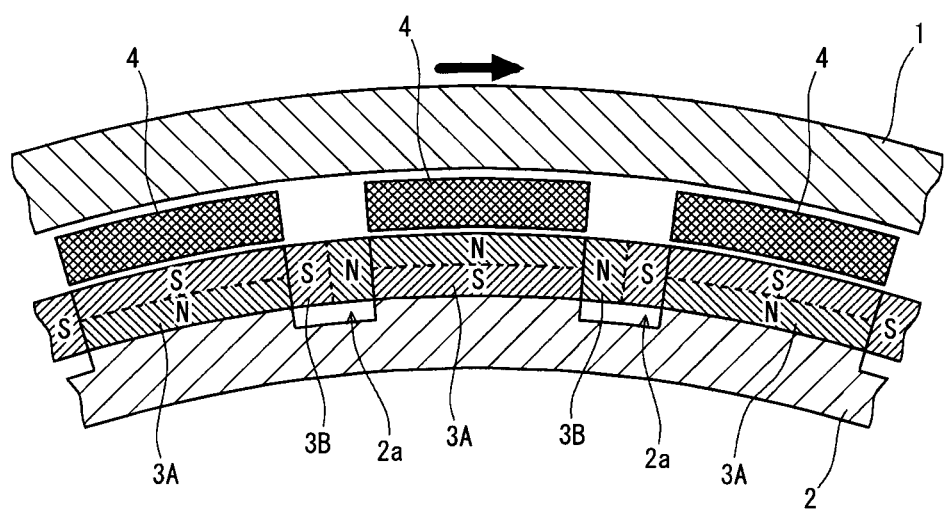
FIG. 13C is a cross-sectional view showing the generation status of magnetic circuits in the non-braking state in the deceleration device according to the third embodiment.

FIG. 11 is a perspective view showing the arrangement of magnets in a deceleration device according to a third embodiment. FIGS. 12A to 12C show the generation status of magnetic circuits in a braking state in the deceleration device according to the third embodiment. FIGS. 13A to 13C show the generation status of magnetic circuits in a non-braking state in the deceleration device according to the third embodiment. FIGS. 12A and 13A are sectional views along a circumferential direction. FIGS. 12B and 13B are longitudinal sectional views of the deceleration device. FIGS. 12C and 13C are cross-sectional views of the deceleration device. The deceleration device according to the third embodiment is a modification of the second embodiment, and differs from the second embodiment in the switching mechanism.

The deceleration device according to the third embodiment employs a three-row rotation switching mechanism as a switching mechanism for switching between a braking state and a non-braking state. Specifically, the primary magnets 3A, the secondary magnets 3B and the magnet holding ring 2 are located inside the brake drum 1 at all times, and are not movable in the axial direction along the axis of the rotary shaft 10. The array of magnets 3A and 3B is divided into a first row (C1), a second row (C2) and a third row (C3), each of the rows extending in the circumferential direction along the circumference of the rotary shaft 10. The magnet holding ring 2 is divided into a first section, a second section and a third section holding the first row of magnets, the second row of magnets and the third row of magnets, respectively. The first row of magnets 3A and 3B and the first section of the magnet holding ring 2, the second row of magnets 3A and 3B and the second section of the magnet holding ring 2, and the third row of magnets 3A and 3B and the third section of the magnet holding ring 2 are located with narrow gaps in between, and are independent of one another. The length (dimension in the axial direction along the axis of the rotary shaft 10) of the primary magnets 3A in the first and the third rows is nearly equal to a half of the length of the primary magnets 3A in the second row, and the length of the secondary magnets 3B in the first and the third rows is nearly equal to a half of the length of the secondary magnets 3B in the second row (see FIGS. 11, 12A, 12B, 13A and 13B).

According to the third embodiment, each of the plate-like switches 4 has a size as follows. The dimension of the switch 4 in the circumferential direction along the circumference of the rotary shaft 10 is nearly equal to that of each of the primary magnets 3A (see FIGS. 12C and 13C). The dimension of the switch 4 in the axial direction along the axis of the rotary shaft 10 is nearly equal to the total of that of a primary magnet 3A in the first row, that of a primary magnet 3A in the second row and that of a primary magnet 3A in the third row (see FIGS. 12B and 13B).

Out of the first to the third sections of the magnet holding ring 2, the first section and the third section of the magnet holding ring 2 are fixed to the stator support 7. The second section of the magnet holding ring 2, on the other hand, is supported by the stator support 7 to be rotatable around the rotary shaft 10. To the second section of the magnet holding ring 2, a drive unit (not shown) such as an air cylinder, an electric actuator or the like is connected. For switching to a braking state or a non-braking state, the drive unit operates to rotate the second section of the magnet holding ring 2 and the second row of magnets 3A and 3B together. Thereby, the deceleration device can be switched between a braking state and a non-braking state.

In the braking state, a primary magnet 3A in the first row and a primary magnet 3A in the second row and a primary magnet 3A in the third row that have the same magnetic pole arrangement are aligned in the axial direction along the axis of the rotary shaft 10, and a secondary magnet 3B in the first row and a secondary magnet 3B in the second row and a secondary magnet 3B in the third row that have the same magnetic pole arrangement are aligned in the axial direction (see FIGS. 12A and 12B). In the non-braking state, on the other hand, a primary magnet 3A in the first row, a primary magnet 3A in the second row and a primary magnet 3A in the third row are aligned in the axial direction such that two axially adjacent primary magnets 3A have opposite magnetic pole arrangements, and a secondary magnet 3B in the first row, a secondary magnet 3B in the second row and a secondary magnet 3B in the third row are aligned in the axial direction such that two axially adjacent secondary magnets 3B have opposite magnetic pole arrangements (see FIGS. 10A and 10B). In either state, the switches 4 are located over the first primary magnets 3A (see FIGS. 12C and 13C).

In the non-braking state, the three-row rotation switching mechanism keeps the magnets 3A and 3B such that two axially adjacent primary magnets 3A have opposite magnetic pole arrangements and such that two axially adjacent secondary magnets 3B have opposite magnetic pole arrangements. In this state, the magnetic fluxes from the magnets 3A and 3B (the magnetic fields of the magnets 3A and 3B) are as follows.

In a longitudinal section along the axial direction, as shown in FIG. 13B, for example, regarding a first primary magnet 3A in the second row and a second primary magnet 3A in the first row among three axially aligned primary magnets 3A, the magnetic flux outgoing from the north pole of the first primary magnet 3A reaches the south pole of the second primary magnet 3A via the switch 4 located over the three axially aligned primary magnets 3A. On the magnetic flux, the magnetic fluxes outgoing from the north poles of the secondary magnets 3B that are in contact with the first primary magnet 3A are superimposed. The magnetic flux outgoing from the second primary magnet 3A reaches the south pole of the first primary magnet 3A via the magnetic holding ring 2. Thus, the two axially adjacent primary magnets 3A, and the secondary magnet 3B that is in contact with the two primary magnets 3A form a strong magnetic circuit across the primary magnets 3A, the secondary magnet 3B, the magnetic holding ring 2 and the switch 4. Such magnetic circuits are formed throughout the whole circumference such that adjacent magnetic fluxes are in opposite directions. The magnets 3A and 3B in the second and the third rows form magnetic circuits in the same manner.

In this state, as shown in FIG. 13C, no magnetic circuits are formed in cross-sections along the circumferential direction. This is because strong magnetic circuits are formed in sections along the axial direction.

In the braking state, on the other hand, the three-row rotation switching mechanism keeps the magnets 3A and 3B such that three axially aligned primary magnets 3A have the same magnetic pole arrangement and such that three axially aligned secondary magnets 3B have the same magnetic pole arrangement as shown in FIGS. 12A to 12C. In this state, the magnetic fluxes from the magnets 3A and 3B (the magnetic fields of the magnets 3A and 3B) are as follows.

Regarding a first primary magnet 3A and a second primary magnet 3A that are adjacent to each other in the circumferential direction, as shown in FIG. 12C, the magnetic flux outgoing from the north pole of the first primary magnet 3A passes through the switch 4 located over the first primary magnet 3A and reaches the brake drum 1. On the magnetic flux, the magnetic fluxes outgoing from the north poles of the secondary magnets 3B that are in contact with the first primary magnet 3A are superimposed. The magnetic flux that has reached the brake drum 1 reaches the south pole of the second primary magnet 3A through the switch 4 located over the second primary magnet 3A. The magnetic flux outgoing from the north pole of the second primary magnet 3A reaches the south pole of the first primary magnet 3A via the magnet holding ring 2.

Thus, in the deceleration device according to the third embodiment, in the braking state and the non-braking state, magnetic circuits are formed in the same manner as in the deceleration device according to the second embodiment. Accordingly, the deceleration device according to the third embodiment has the same advantageous effects as the deceleration device according to the second embodiment. In the third embodiment where the three-row rotation switching mechanism is employed, the magnetic fluxes from the magnets 3A and 3B in the non-braking state scatter, as compared with the case where the two-row rotation switching mechanism is employed. In the third embodiment, therefore, generation of magnetic leakage loss torque in the non-braking state can be prevented more effectively.

The present invention is not limited to the above-described embodiments, and various changes and modifications are possible without departing from the scope of the present invention. For example, the two-row rotation switching mechanism in the second embodiment may be modified as follows. The first section of the magnet holding ring 2 is rotatably supported by the stator support 7, and the second section of the magnet holding ring 2 is fixed to the stator support 7. In short, it is required that either the first section or the section of the magnet holding ring 2 is rotatable around the rotary shaft 10.

Also, the three-row rotation switching mechanism in the third embodiment may be modified as follows. The first section and the third section of the magnet holding ring 2 are rotatably supported by the stator support 7, and the second section of the magnet holding ring 2 is fixed to the stator support 7. In short, it is required that either the first and the third sections of the magnet holding ring 2 or the second section of the magnet holding ring 2 is rotatable around the rotary shaft 10.

In the above-described embodiments, the magnets 3A, 3B and the magnet holding ring 2 are located inside the brake drum 1 such that the magnets 3A and 3B face the inner peripheral surface of the brake drum 1. In an opposite manner, the magnets 3A, 3B and the magnet holding ring 2 may be located outside the brake drum 1 such that the magnets 3A and 3B face the outer peripheral surface of the brake drum 1. In this case, the magnets 3A and 3B are supported on the inner peripheral surface of the magnet holding ring 2.

Figure 14:
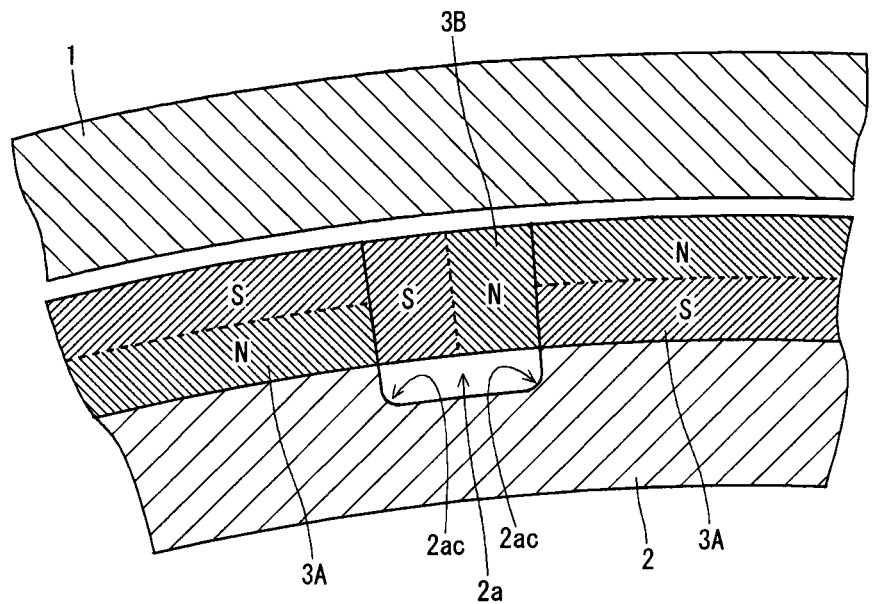
FIG. 14 is a sectional view of a deceleration device according to a modification of the present invention.

In the deceleration device according to the present invention, the non-magnetic member located between each of the secondary magnets 3B and the magnetic holding ring 2 may have a rounded-off corner on the side farther from the brake drum 1. FIG. 14 shows an example of such structures. FIG. 14 shows a section perpendicular to the rotation axis. The magnetic holding ring 2 shown in FIG. 14 has recessed portions (grooves) that are to become the spaces 2a, and the two corners at the bottom of each of the recessed portions are rounded-off. In the example shown in FIG. 14, the non-magnetic member (atmospheric air) present in each of the spaces 2a has rounded-off corners at the corners 2ac on the farther side from the brake member 1. This structure provides an effect of preventing a magnetic flux flowing in the magnetic holding ring 2 from being interrupted by the corners of the non-magnetic member.

Figure 15:
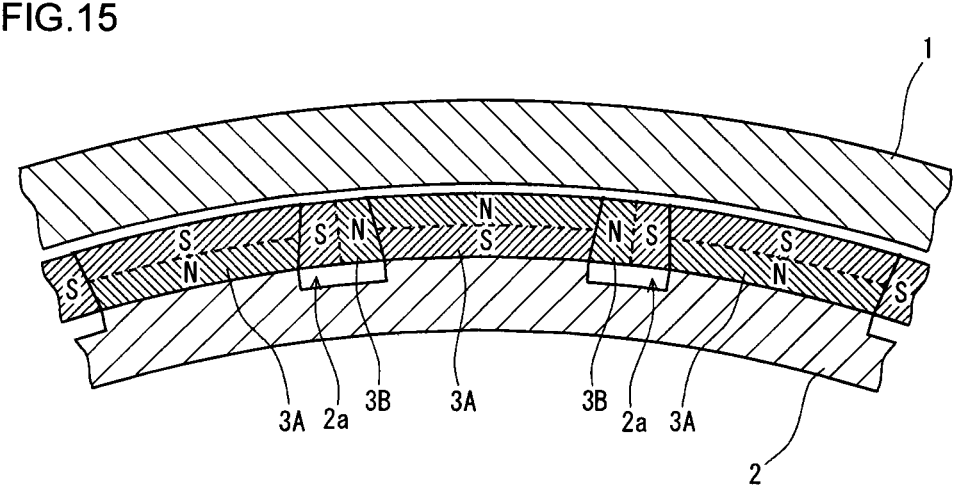
FIG. 15 is a sectional view of a deceleration device according to another modification of the present invention.

In the deceleration device according to the present invention, the dimension in the circumferential direction of the secondary magnets 3B may decrease with decreasing distance from the brake drum 1. FIG. 15 shows an example of such structures. FIG. 15 shows a section (cross section) perpendicular to the axial direction along the rotation axis.

In the example shown in FIG. 15, the dimension in the circumferential direction of the secondary magnets 3B decreases with decreasing distance from the brake drum 1. The cross-sectional shape of each of the secondary magnets 3B is an isosceles trapezoid with the side near the brake drum 1 short, and is line symmetric with respect to a line extending radially from the rotation axis. Meanwhile, the cross-sectional shape of each of the primary magnets 3A is an isosceles trapezoid with the side near the brake drum 1 long, and is line symmetric with respect to a line extending radially from the rotation axis. In this structure, the inclined side walls of the secondary magnets 3B are pressed down by the inclined side walls of the primary magnets 3A. This prevents the secondary magnets 3B from popping out toward the brake drum 1. When solid non-magnetic members are filled in the spaces 2a, the shapes of the primary magnets 3A and the secondary magnets 3B shown in FIG. 15 facilitate fixation of the secondary magnets 3B.

The examples shown in FIGS. 14 and 15 are modifications of the structure shown in FIGS. 5 to 7. The structures shown in FIGS. 14 and 15 can be employed in any other deceleration device according to the present invention.

INDUSTRIAL APPLICABILITY

The deceleration device according to the present invention can be effectively used as an auxiliary brake for any type of vehicle.

LIST OF REFERENCE SYMBOLS

1: brake drum (brake member)
1a: radiator fin
2: magnet holding ring (magnet holder)
2a: space (non-magnetic member)
3: permanent magnet
3A: primary magnet
3B: secondary magnet
4: plate-like switch
5: switch holding ring
6: rotor support
7: stator support
10: rotary shaft

The invention claimed is:

1. An eddy current deceleration device comprising:
a cylindrical brake member fixed to a rotary shaft;
a plurality of permanent magnets arrayed in a circumferential direction of a circle around the rotary shaft to face an outer peripheral surface or an inner peripheral surface of the brake member with a gap;
a cylindrical magnet holder holding the permanent magnets; and
a switching mechanism that switches between a braking state and a non-braking state, wherein:
the plurality of permanent magnets are located between the brake member and the magnet holder;
the plurality of permanent magnets include primary magnets and secondary magnets that are arrayed alternatively in the circumferential direction;
the primary magnets are laid such that magnetic poles of each of the primary magnets are arranged in a radial direction from an axis of the rotary shaft and such that two circumferentially adjacent ones of the primary magnets have opposite magnetic pole arrangements;
the secondary magnets are laid such that magnetic poles of each of the secondary magnets are arranged in the circumferential direction;
when viewed on a surface facing the brake member, north poles of the primary magnets are circumferentially adjacent to north poles of the secondary magnets, and south poles of the primary magnets are circumferentially adjacent to south poles of the secondary magnets; and
the magnetic holder is ferromagnetic.

2. The eddy current deceleration device according to claim 1, wherein
a non-magnetic member is provided between each of the secondary magnets and the magnet holder.

3. The eddy current deceleration device according to claim 2, wherein:
a space is made between each of the secondary magnets and the magnet holder; and
the non-magnetic member is atmospheric air in the space.

4. The eddy current deceleration device according to claim 3, wherein
the non-magnetic member has a rounded-off corner on a side farther from the brake member.

5. The eddy current deceleration device according to claim 4, wherein
each of the secondary magnets has a dimension in the circumferential direction that decreases with decreasing distance from the brake member.

6. The eddy current deceleration device according to claim 3, wherein each of the secondary magnets has a dimension in the circumferential direction that decreases with decreasing distance from the brake member.

7. The eddy current deceleration device according to claim 2, wherein
the non-magnetic member has a rounded-off corner on a side farther from the brake member.

8. The eddy current deceleration device according to claim 7, wherein
each of the secondary magnets has a dimension in the circumferential direction that decreases with decreasing distance from the brake member.

9. The eddy current deceleration device according to claim 2, wherein
each of the secondary magnets has a dimension in the circumferential direction that decreases with decreasing distance from the brake member.

10. The eddy current deceleration device according to claim 1, wherein
each of the secondary magnets has a dimension in the circumferential direction that decreases with decreasing distance from the brake member.

11. The eddy current deceleration device according to claim 1, wherein:
the array of primary and secondary magnets is divided into a first row and a second row, each of the rows extending in the circumferential direction, and the magnet holder is divided into a first section and a second section holding the first row of primary and secondary magnets and the second row of primary and secondary magnets, respectively;
in the gap between the brake member and the primary magnets, a plurality of plate-like ferromagnetic switches are arrayed in the circumferential direction to be positioned at same placement angles as placement angles of the primary magnets;
either the first section or the second section of the magnet holder is rotatable around the rotary shaft; and
the switching between the braking state and the non-braking state is carried out by a rotation of the first section of the magnet holder or the second section of the magnet holder.

12. The eddy current deceleration device according to claim 11, wherein:
in the non-braking state, the permanent magnets are positioned such that two axially adjacent ones of the primary magnets have opposite magnetic pole arrangements and such that two axially adjacent ones of the secondary magnets have opposite magnetic pole arrangements; and in the braking state, the permanent magnets are positioned such that two axially adjacent ones of the primary magnets have a same magnetic pole arrangement and such that two axially adjacent ones of the secondary magnets have a same magnetic pole arrangement.

13. The eddy current deceleration device according to claim 11, wherein
a dimension in the circumferential direction of each of the plate-like switches is equal to a dimension in the circumferential direction of each of the primary magnets.

14. The eddy current deceleration device according to claim 1, wherein:
the array of primary and secondary magnets is divided into a first row, a second row and a third row, each of the rows extending in the circumferential direction, and the magnet holder is divided into a first section, a second section and a third section holding the first row of primary and secondary magnets, the second row of primary and secondary magnets, and the third row of primary and secondary magnets, respectively;
in the gap between the brake member and the primary magnets, a plurality of plate-like ferromagnetic switches are arrayed in the circumferential direction to be positioned at same placement angles as placement angles of the primary magnets;
either the first and the third sections or the second section of the magnet holder is rotatable around the rotary shaft; and
the switching between the braking state and the non-braking state is carried out by a rotation of the first and the third sections of the magnet holder or the second section of the magnet holder.

15. The eddy current deceleration device according to claim 1, wherein
the magnet holder is movable in the axial direction along the axis of the rotary shaft; and
the switching between the braking state and the non-braking state is carried out by a movement of the magnet holder.

16. The eddy current deceleration device according to claim 1, wherein
a dimension in the circumferential direction of each of the primary magnets is 1.5 to 9 times a dimension in the circumferential direction of each of the secondary magnets.

* * * * *